(12) United States Patent
Karp

(10) Patent No.: US 6,732,127 B2
(45) Date of Patent: May 4, 2004

(54) VERIFIABLE RANDOM NUMBER GENERATOR USING CHAOS

(75) Inventor: Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 458 days.

(21) Appl. No.: 09/758,087

(22) Filed: Jan. 10, 2001

(65) Prior Publication Data

US 2002/0124032 A1 Sep. 5, 2002

(51) Int. Cl.[7] ................................................. G06F 1/02
(52) U.S. Cl. .................................................... 708/250
(58) Field of Search ............................... 708/250–256; 380/46

(56) References Cited

U.S. PATENT DOCUMENTS

| | | | |
|---|---|---|---|
| 5,007,087 A | 4/1991 | Bernstein et al. | 380/46 |
| 5,506,795 A | 4/1996 | Yamakawa | 364/717 |
| 5,696,826 A | 12/1997 | Gao | 380/28 |
| 5,696,828 A | 12/1997 | Koopman, Jr. | 380/46 |
| 5,735,741 A | 4/1998 | Yamazaki et al. | 463/22 |
| 5,781,458 A | 7/1998 | Gilley | 364/717 |
| 5,781,460 A | 7/1998 | Nguyen et al. | 364/724 |
| 5,815,413 A | 9/1998 | Hively et al. | 364/574 |
| 5,890,142 A | 3/1999 | Tanimura et al. | 706/12 |

OTHER PUBLICATIONS

Eguchi and Inoue, A Current–Mode Analog Chaos Circuit Realizing a Henon Map, IEICE Trans. Electron., Jul. 1997, pp. 1063–1066.

Jiping and Hui, A New Method for Genrating Keys, Proceedings of ICSP 1996, pp. 1570–1573.

*Primary Examiner*—Tan V. Mai

(57) ABSTRACT

A verifiable random number generator includes mechanisms for monitoring its chaotic behavior. A random number generator according to the present teachings includes a chaos circuit that generates a number according to a chaos function. The random number generator further includes a check circuit that simulates the chaos function and that determines whether the number is a valid random number by monitoring the chaotic behavior of the chaos function.

16 Claims, 4 Drawing Sheets

VERIFIABLE RANDOM NUMBER GENERATOR USING CHAOS

BACKGROUND OF THE INVENTION

1. Field of Invention

The present invention pertains to the field of random number generators. More particularly, this invention relates to a verifiable random number generator using chaos.

2. Art Background

Random number generators may be employed in a variety of applications. For example, random number generators may be used in cryptography to generate cryptographic keys. Other example applications of random number generators include test data generation, Monte-Carlo simulation, and spread-spectrum communication to name a few.

A random number generator may be based on a chaotic system in which random numbers are derived from the states of the chaotic system. A chaotic system may be defined as one in which two particles in nearly identically states separate exponentially fast with time. It is usually desirable that the exponential separation be great enough to prevent the prediction of the state of the two particles at some time sufficiently far in the future based on the current state of the two particles.

A chaotic system suitable for use in a random number generator may be implemented using an oscillator circuit in which the two separating particles are represented by electrical properties of the oscillator circuit such as voltage or current states. Typically, the exponential separation in these oscillator states is determined by the oscillator frequency times a constant which is commonly referred to as the Lyupanov exponent. Typically, the oscillator circuit is implemented so that the Lyupanov exponent is high enough to provide sufficient separation in the oscillator states over time to yield chaotic behavior.

Hardware failures in an oscillator circuit and/or unforseen system interactions between an oscillator circuit and other elements of a system may cause the effective value of the Lyupanov exponent to approach an undesirably low value. Unfortunately, a low value of the Lyupanov exponent may increase the predictability of the oscillator states, thereby increasing the predictability of random numbers derived from the oscillator states. In a cryptographic system, for example, predictable oscillator states may enable the determination of cryptographic keys which are based on random numbers derived from the oscillator states, thereby enabling unauthorized parties to crack the cryptographic system.

SUMMARY OF THE INVENTION

A verifiable random number generator is disclosed that includes mechanisms for monitoring its chaotic behavior. A random number generator according to the present teachings includes a chaos circuit that generates a number according to a chaos function. The random number generator further includes a check circuit that simulates the chaos function and that determines whether the number is a valid random number by monitoring the chaotic behavior of the chaos function as indicated by the Lyupanov exponent.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
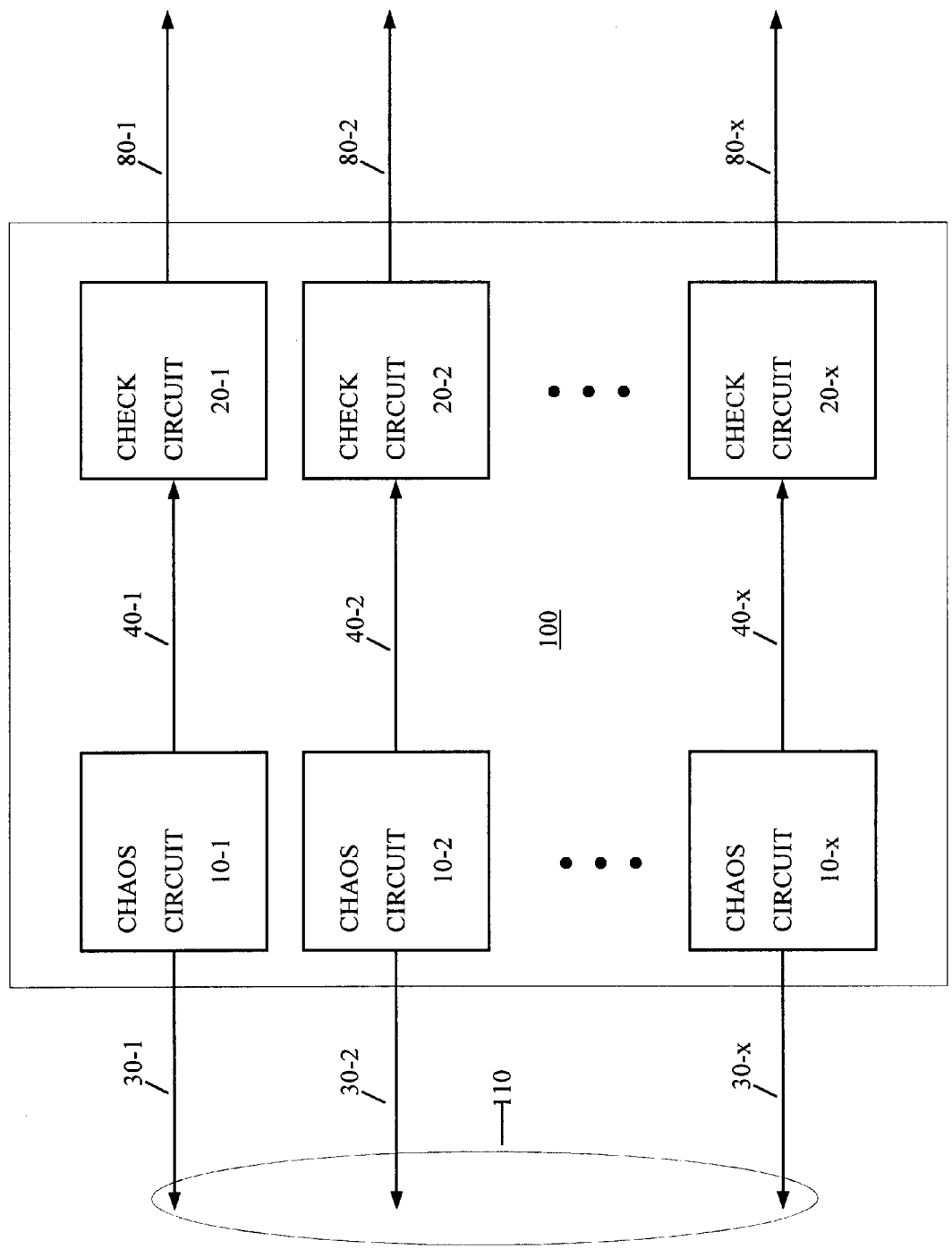
FIG. 1 illustrates a random number generator according to the present teachings.

FIG. 1 illustrates a random number generator 100 according to the present teachings. The random number generator 100 includes a set of chaos circuits 10-1 through 10-x and a set of check circuits 20-1 through 20-x that monitor the chaotic behavior of the chaos circuits 10-1 through 10-x, respectively.

The chaos circuits 10-1 through 10-x each generate a corresponding random number according to a chaos function. The random number generator 100 yields a random number 110. The random number 110 includes a set of random bits 30-1 through 30-x. The random bits 30-1 through 30-x are the least significant bits of the random numbers generated by the chaos circuits 10-1 through 10-x, respectively.

The check circuits 20-1 through 20-x simulate the chaos functions of the chaos circuits 10-1 through 10-x, respectively. The check circuits 20-1 through 20-x take a set of outputs 40-1 through 40-x from the chaos circuits 10-1 through 10-x, respectively, and in response determine whether the corresponding random bits 30-1 through 30-x are valid random numbers. The check circuits 20-1 through 20-x generate a set of valid signals 80-1 through 80-x that indicate whether the random bits 30-1 through 30-x, respectively, are valid random numbers.

The following description focuses on the interactions between the chaos circuit 10-1 and the check circuit 20-1. The interaction between the chaos circuits 10-2 through 10-x and the check circuits 20-2 through 20-x may be implemented in a substantially similar manner.

In one embodiment, the chaos circuit 10-1 is implemented as an oscillator that generates an electrical current y as a function of voltage x and the check circuit 20-1 is implemented with a substantially similar oscillator circuit. Periodically, a pair of voltage and current values are provided from the chaos circuit 10-1 to the check circuit 20-1 for synchronization. At the time of synchronization, the check circuit 20-1 perturbs the values $x_1, y_1$ received from the chaos circuit 10-1 to $x_1, y_i + d$. Thereafter, the chaos circuit 10-1 and the check circuit 20-1 independently generate x,y value pairs that separate by a distance $\Delta$ according to the following (equation 1):

$$\Delta = \sqrt{(\hat{x}_2 - x_2)^2 + (\hat{y}_2 - y_2)^2}$$

where $x_1, y_1$, are the values generated by the chaos circuit 10-1 at the time of synchronization $t_1$, $x_2, y_2$ are the values generated by the chaos circuit 10-1 at time $t_2$, $\hat{x}_2, \hat{y}_2$ are the values generated by the check circuit 20-1 at time $t_2$. Equation 1 is valid so long as there is are relatively short time interval between times $t_2$ and $t_1$, so the synchronization period should be set accordingly.

The sufficiency of chaos is indicated by the Lyupanov exponent and the check circuit 20-1 determines by using the value of $\Delta$ obtained from equation 1 according to the following (equation 2):

$$L_c = \frac{\ln(\Delta)}{t_2 - t_1}$$

where $L_c$ is the calculated value of the Lyupanov exponent based on the $\Delta$ value yielded by equation 1.

The check circuit 20-1 periodically calculates the Lyupanov exponent $L_c$ c and compares it to a desired value. If the calculated Lyupanov exponent $L_c$ is not greater than or equal to $2L_0$ where $L_0$ is the value of the Lyupanov exponent implemented in the chaos circuit 10-1 and the check circuit 20-1 then either the chaos circuit 10-1 or the check circuit 20-1 has an error or unforseen system interaction, etc., that has caused it to become no longer chaotic. Therefore, the check circuit 20-1 asserts the valid signal 80-1 to indicate that the random bit 30-1 is not valid. Otherwise, the check circuit 20-1 asserts the valid signal 80-1 to indicate that the random bit 30-1 is valid.

In one embodiment, the chaos circuit 10-1 and the check circuit 20-1 are implemented such that the Lyupanov exponent $L_0$ is greater than or equal to 1.5 to provide the desired chaotic behavior. If the calculated Lyupanov exponent $L_c$ falls to or below a value of 3 then the check circuit 20-1 asserts the valid signal 80-1 to indicate that the random bit 30-1 is not valid.

The divergence in $x_S$ and $x_{CH}$ according to the chaos function of equation 1 may be realized using a variety of mechanisms. For example, the chaos circuit circuit 10-1 and the check circuit 20-1 may implement different mechanisms for rounding numbers. Alternatively, the check circuit 20-1 may include circuitry that perturbs the x and/or y values obtained from the chaos circuit 10-1 via the output 40-1. An x and/or y value may be perturbed, for example, by inverting a bit or by adding/subtracting a small value or by truncating the value, etc.

The chaos circuits 10-1 through 10-x and the check circuits 20-1 through 20-x may be implemented as analog or digital circuits or any combination of analog and digital circuits. For example, the chaos circuit 10-1 may be an analog circuit that iteratively generates voltage and current values according to equation 1 and the check circuit 20-1 may be a digital circuit that simulates the x and y values generated by the chaos circuit 10-1 according to equation 1. Alternatively, the chaos circuit 10-1 and the check circuit 20-1 may both be analog circuits or may both be digital circuits or the chaos circuit 10-1 may be a digital circuit and the check circuit 20-1 may be an analog circuit.

Figure 2:
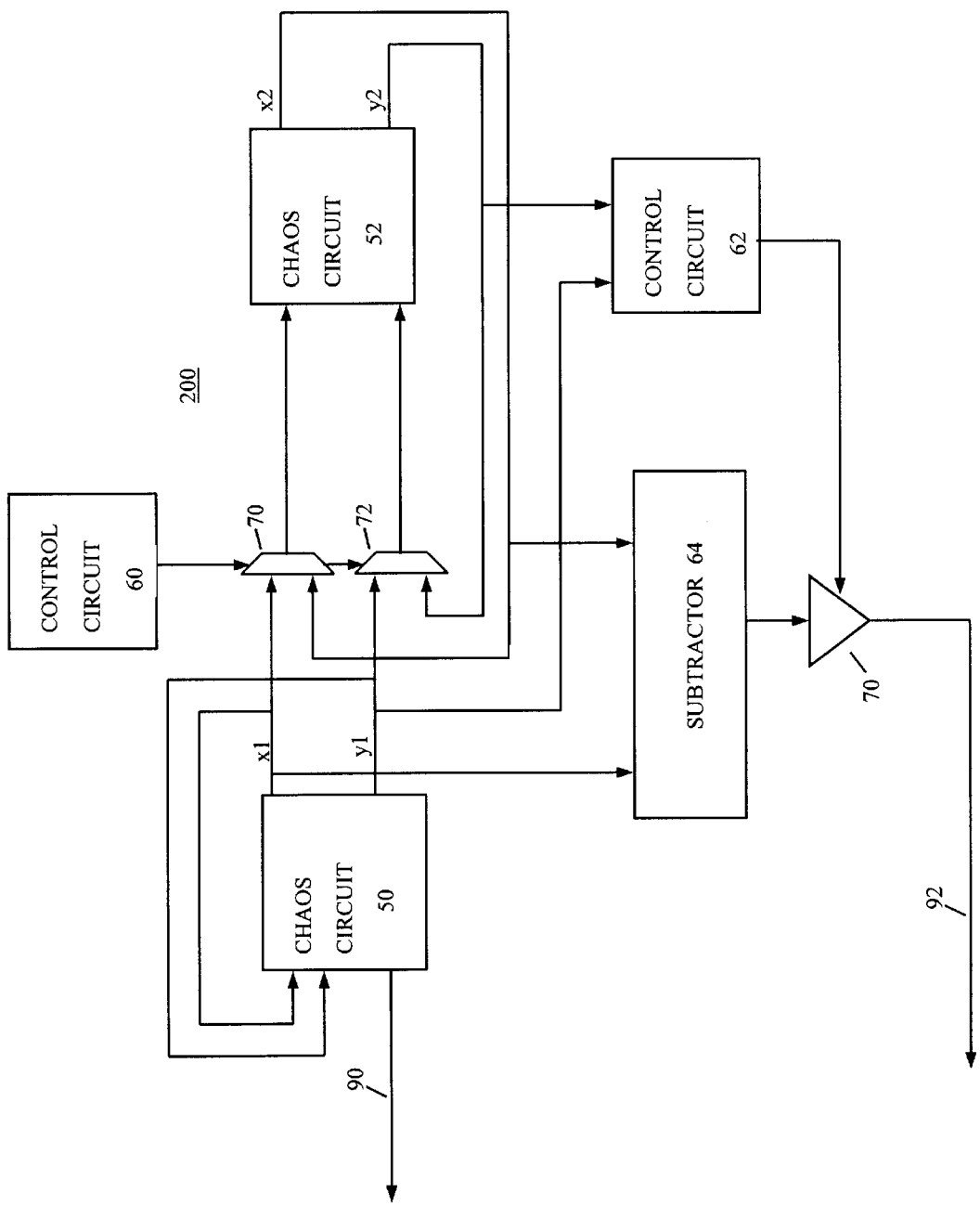
FIG. 2 shows another random number generator according to the present teachings.

FIG. 2 shows a random number generator 200 according to the present teachings. The random number generator 200 generates a random bit 90 and a valid signal 92 that indicates whether the random bit 90 is a valid random number. The random number generator 200 includes a chaos circuit 50 that generates the random bit 90 according to a chaos function and a chaos circuit 52 that simulates the chaos function of the chaos circuit 50. The circuitry shown for the random number generator 200 may readily be extended to generate a random number having any number of random bits along with corresponding valid signals.

The chaos circuit 50 generates an analog signal x1 and an analog signal y1 according to a chaos function such as given in equation 1. In one embodiment, the analog signal x1 is an electrical voltage level and the analog signal y1 is an electrical current level. The chaos circuit 52 generates an analog signal x2 and an analog signal y2 according the chaos function of the chaos circuit 50.

The analog signals x1 and y1 are fed back into the chaos function inputs of the chaos circuit 50 and are also fed to the chaos function inputs of the chaos circuit 52 via a pair of multiplexors 70–72 which are controlled by a control circuit 60. The multiplexors 70–72 are also used to feed the analog signals x2 and y2 generated by the chaos circuit 52 back into chaos function inputs to the chaos circuit 52.

The control circuit 60 periodically selects the analog signals x1 and y1 for input to the chaos circuit 52. Then for the next several cycles of the random number generator 200, the control circuit 60 selects the analog signals x2 and y2 for input back into to the chaos circuit 52. During this time, a control circuit 62 detects when both analog signals y1 and y2 are zero and in response enables a buffer 70 which drives the valid signal 92. An analog subtractor 64 subtracts the analog signals x1 and x2 and provides the result to the buffer 70. The buffer 70 has a threshold that is tuned to generate a high level of the valid signal 92 when the result from the subtractor 64 is greater than a predetermined amount which indicates a suitable chaotic level in the random bit generator 200 and a valid random bit 90. The predetermined amount tuned into the buffer 70 is preselected to ensure a suitable chaotic divergence between x1 and x2 after the chaos circuits 50–52 have been synchronized and let free to run independently.

The chaos circuits 50–52 and the subtractor 64 may alternatively be implemented as digital circuits that generate and process digital x1, y1 and x2, y2 values or may be implemented as a combination of analog and digital circuitry.

Figure 3:
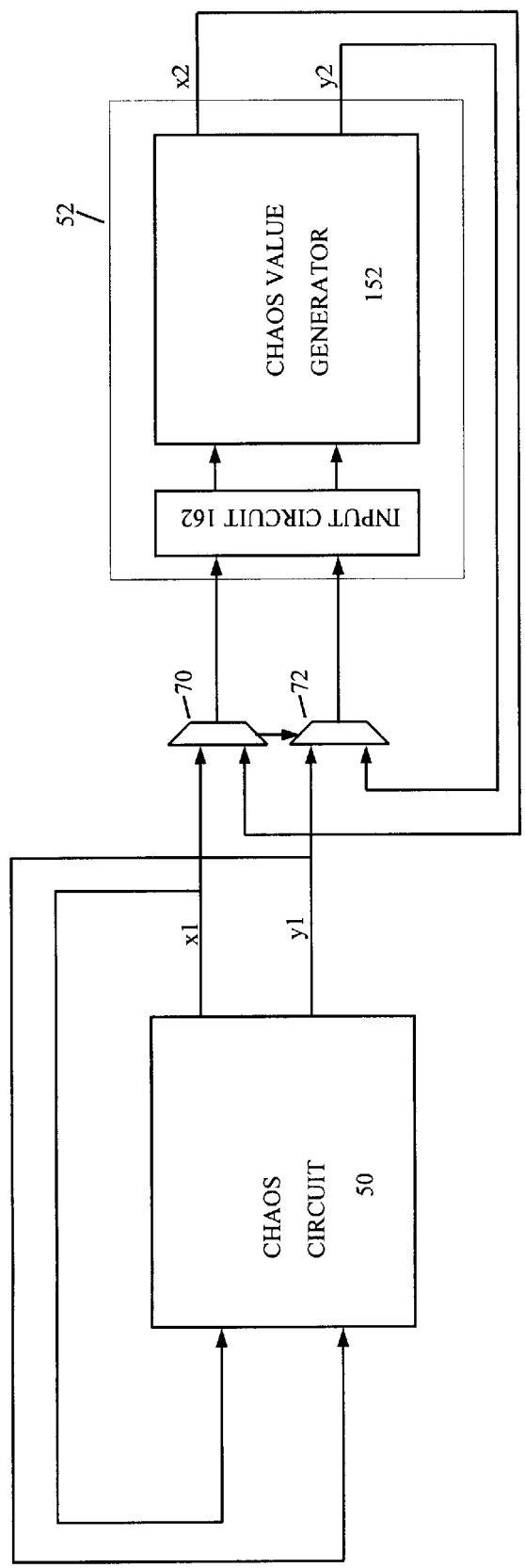
FIG. 3 shows an example arrangement of a chaos circuit that yields exponential separation in the oscillator states.

FIG. 3 shows an example arrangement of the chaos circuits 50–52 that yields exponential separation in the x1, y1 and x2, y2 values. In this arrangement, the analog x1 and y1 values from the chaos circuit 50 are digitized by an input circuit 162 in the chaos circuit 52. The input circuit 162 perturbs the values of x1 and y1 so that subsequent iterations in a chaos function performed by a chaos value generator 152 will generate x2 and y2 values that diverge from corresponding x1 and y1 values generated by the chaos circuit 50.

In alternative arrangements, the input circuit 162 performs a different rounding method than equivalent input circuitry of the chaos circuit 50, thereby yielding divergence in the x1, y1 and x2, y2 values. For example, the input circuit 162 may round up while the equivalent input circuitry of the chaos circuit 50 rounds down, or visa versa, or the input circuit 162 may round to a different number of bits than equivalent input circuitry of the chaos circuit 50.

Figure 4:
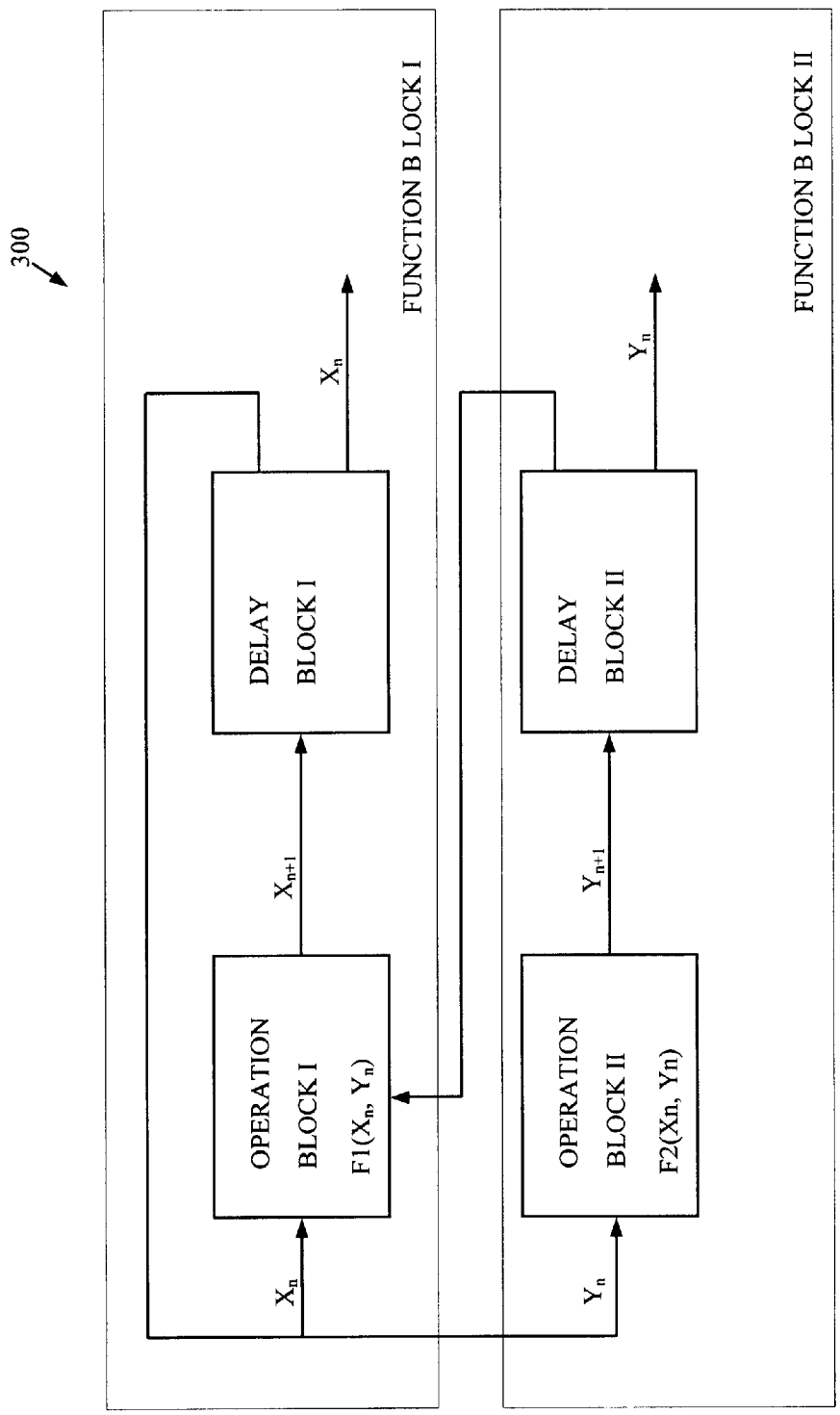
FIG. 4 shows is a block diagram of a chaos circuit which may be employed in a random number generator according to the present teachings.

FIG. 4 shows is a block diagram of a chaos circuit 300 which may be employed in a random number generator according to the present teachings. The chaos circuit 300 includes a pair of function blocks I–II. The chaos circuit 300 implements the following equations:

$$X_{n+1} = F_1(X_n, Y_n) = 1 + Y_n - AX_n^2,$$

$$Y_{n+1} = F_2(X_n, Y_n) = BX_n$$

where A and B are tunable parameters that yield chaotic behavior as $X_{n+1}$ and $Y_{n+1}$ are iteratively generated. The function block I includes an operation block I and a delay block I that generates the $X_{n+1}$ values. The function block II includes an operation block II and a delay block II that generates the $Y_{n+1}$ values.

The operation blocks I–II may be implemented using analog or digital circuitry or a combination of analog and digital circuitry.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A random number generator, comprising:
   a chaos circuit that generates a random number according to a chaos function;
   a check circuit that simulates the chaos function and determines whether the random number is valid, and wherein the check circuit includes circuitry for determining a Lyupanov exponent of the chaos function.

2. The random number generator of claim 1, wherein the check circuit generates an indication that the random number is valid if the Lyupanov exponent is greater than a predetermined value and not otherwise.

3. A random number generator, comprising:
   a chaos circuit that generates a random number according to a chaos function;
   a check circuit that simulates the chaos function and determines whether the random number is valid, and wherein the chaos circuit generates a set of values according to the chaos function and the check circuit periodically synchronizes to the values.

4. The random number generator of claim 3, wherein the check circuit includes circuitry for perturbing one or more of the values from the chaos circuit.

5. The random number generator of claim 3, wherein the check circuit compares a subset of the values from the chaos circuit to corresponding values generated in the check circuit to determine whether the random number is valid.

6. A random number generator, comprising:
   a set of chaos circuits that generate a random number, each chaos circuit generating a corresponding bit of the random number according to a corresponding chaos function;
   a set of check circuits that simulate the chaos functions and that determine whether the bits are valid.

7. The random number generator of claim 6, wherein each check circuit includes circuitry for determining a Lyupanov exponent of the corresponding chaos function.

8. The random number generator of claim 7, wherein each check circuit generates an indication that the corresponding bit is valid if the corresponding Lyupanov exponent is greater than a corresponding predetermined value and not otherwise.

9. The random number generator of claim 6, wherein each chaos circuit generates a set of values according to the corresponding chaos function and the corresponding check circuit periodically synchronizes to the values.

10. The random number generator of claim 9, wherein each check circuit includes circuitry for perturbing one or more of the values from the corresponding chaos circuit.

11. The random number generator of claim 9, wherein each check circuit compares a subset of the values from the corresponding chaos circuit to corresponding values generated in the corresponding check circuit to determine whether the corresponding bit is valid.

12. A method for generating random number, comprising the steps of:
    generating a random number according to a chaos function;
    simulating the chaos function and determining whether the random number is valid, and wherein the step of determining whether the random number is valid includes the step of determining a Lyupanov exponent of the chaos function.

13. The method of claim 12, wherein the step of determining whether the random number is valid includes the step of generating an indication that the random number is valid if the Lyupanov exponent is greater than a predetermined value and not otherwise.

14. A method for generating random number, comprising the steps of:
    generating a random number according to a chaos function;
    simulating the chaos function and determining whether the random number is valid, and wherein the step of simulating the chaos function includes the step of periodically synchronizing to a set of values generated by the chaos function.

15. The method of claim 14, further comprising the step of perturbing one or more of the values generated by the chaos function.

16. The method of claim 14, wherein the step of determining whether the random number is valid includes the step of comparing a subset of the values generated by the chaos functions to corresponding simulated values.

* * * * *